(12) United States Patent
Schreiner et al.

(10) Patent No.: US 6,554,603 B1
(45) Date of Patent: Apr. 29, 2003

(54) PLASTIFYING UNIT IN INJECTION-MOULDING MACHINES WITH A NONRETURN VALVE

(75) Inventors: Helmut Schreiner, Nürnberg (DE); Dieter Schimmel, Roth (DE); Jörg Seidel, Burgthann (DE); Dieter Streng, Heilsbronn (DE)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 09/830,093

(22) PCT Filed: Sep. 14, 1999

(86) PCT No.: PCT/DE99/02971
§ 371 (c)(1),
(2), (4) Date: May 30, 2001

(87) PCT Pub. No.: WO00/23248
PCT Pub. Date: Apr. 27, 2000

(30) Foreign Application Priority Data

Oct. 21, 1998 (DE) ......................... 198 49 472

(51) Int. Cl.⁷ .............................................. B29C 45/52
(52) U.S. Cl. ...................... 425/559; 425/562; 425/563
(58) Field of Search ............................... 425/559, 562, 425/563; 264/328.19

(56) References Cited

U.S. PATENT DOCUMENTS

| | | | | |
|---|---|---|---|---|
| 4,349,044 A | * | 9/1982 | Schirmer | 425/562 |
| 4,701,293 A | * | 10/1987 | Mead | 425/419 |
| 5,167,971 A | * | 12/1992 | Gill et al. | 425/559 |
| 5,441,400 A | * | 8/1995 | Zeiger | 425/562 |
| 5,547,363 A | * | 8/1996 | Takai et al. | 425/464 |
| 6,227,841 B1 | * | 5/2001 | Viron | 425/563 |

FOREIGN PATENT DOCUMENTS

| | | | |
|---|---|---|---|
| DE | 3717735 | * | 2/1988 |
| EP | 61246031 | * | 11/1986 |
| EP | 62130818 | * | 6/1987 |
| EP | 08224761 | * | 9/1996 |

OTHER PUBLICATIONS

Hackh's Chemical Dictionary, 1972, p. 131.*

* cited by examiner

Primary Examiner—Tim Heitbrink
(74) Attorney, Agent, or Firm—Cohen, Pontani, Lieberman & Pavane

(57) ABSTRACT

The invention relates to a plasticizing unit in injection-moulding machines, in particular for processing thermoplastics, with a plasticizing cylinder in which a rotatable and axially displaceable screw is arranged, at the head of which a non-return valve is provided, which has an axially displaceable barrier sleeve which encloses with radial play a tapered region which belongs to a basic body fixed in the screw head and is present between blades and a stop ring. The basic body has at least three blades, in that supporting elements provided on the surfaces of the blades facing the barrier sleeve, wherein at least the supporting surfaces of the supporting elements are made of a hard-wearing material.

19 Claims, 4 Drawing Sheets

PLASTIFYING UNIT IN INJECTION-MOULDING MACHINES WITH A NONRETURN VALVE

PRIORITY CLAIM

This is a U.S. national stage of application No. PCT/DE99/02971, filed on Sept. 14, 1999. Priority is claimed on that application and on the following application: Country: Germany, Application No.: 198 49 472.6, filed Oct. 21, 1998.

BACKGROUND OF THE INVENTION

1. Field of the Invention

The invention relates to a plasticizing unit in injection-moulding machines, in particular for processing thermoplastics, with a plasticizing cylinder in which a rotatable and axially displaceable screw is arranged, at the head of which a non-return valve is provided, which has an axially displaceable barrier sleeve which encloses with radial play a tapered region which belongs to a basic body fixed in the screw head and is present between blades and a stop ring.

2. Description of the Related Art

During the injection-moulding of thermoplastics, screws which are axially displaceable in plasticizing cylinders and are rotatable in a defined direction are used. The polymer granules are thereby plasticized by the friction occurring as a result and possibly by heating elements additionally used. For injecting the polymer melt into the cavity of a mould, the screw is used as a ram and, for this purpose, is moved axially in the plasticizing cylinder. To prevent material which is to be plasticized from flowing back during this injection operation, that is to say when the non-rotating screw is advancing, non-return valves are used. These non-return valves have a barrier sleeve, which is pressed during injection against a thrust-ring surface of a basic body arranged at the head of the screw.

During metering, i.e. when the rotating screw is returning, the barrier ring is lifted off the end face, representing the thrust face, and pressed against the bearing surfaces of blades arranged at the head of the basic body. The barrier ring sympathetically rotates at a relatively slow speed as a result of the friction on the wall of the plasticizing cylinder during the rotation of the screw while metering is taking place. This causes dry running between the bearing surfaces of the blades and the barrier sleeve and consequently increased wear.

To reduce the wear, various measures have been proposed. For instance, it is known from DE 37 11 775 A1 to design the corresponding surfaces of the displaceable barrier sleeve and of the blades in such a way that the neighboring end faces form an angle of between 5 and 30°, expediently 15°. By this measure, it is intended during the metering operation, that is to say while the screw is rotating, for plasticized material to be drawn between the surfaces of the barrier sleeve and those of the blades, so that a constantly renewing film of material is maintained there, preventing dry running.

It is known from DE 297 01 495 U1 to grip the barrier sleeve or the stop ring positively during the metering operation and consequently make it rotate at the same speed as the screw itself in the plasticizing cylinder.

In the case of the disclosed plasticizing units in injection-moulding machines, the non-return valves used have a large amount of wear and/or there is local damage to the injection-moulding compound and the contact surface of the barrier sleeve in relation to the blades or the plasticizing cylinder.

SUMMARY OF THE INVENTION

The invention was based on the object of providing a plasticizing unit in injection-moulding machines which, with a simple construction, has a non-return valve which ensures the greatest possible functional reliability with a defined small amount of wear and minimal damage to the polymer material.

According to the invention, supporting elements are provided on the blades of the basic body, with at least the supporting elements being made of a hard-wearing material. If at least three supporting elements are used, the barrier sleeve is supported uniformly on these hard-wearing supporting surfaces during the metering operation.

The constant supporting surfaces, acting like three sliding bearings, have the effect that the frictional force in the direction of the contact surface of the barrier sleeve is calculable and constant during the metering operation.

Furthermore, measures are provided to ensure during the metering operation, that is to say when the screw is rotating and there is relative movement between the blades of the basic body and the barrier sleeve, that the polymer material located here is influenced as little as possible, in particular to prevent damage to the raw material.

In one case, the head ends of the supporting elements protrude beyond the surfaces of the blades. In the other configuration, the surface of the blades facing the barrier sleeve is of an arcuate design. In both cases, a sliding movement between the surface of the blades and the surface of the barrier sleeve is avoided, so that streaking or discoloration of the moulded part cannot occur.

In an advantageous configuration, the supporting elements are designed as pins and are arranged at right angles in relation to the supporting surface of the barrier sleeve. Furthermore, the pins are conically widened in the direction of the barrier sleeve, so that they can be pressed into the blades in a self-securing manner. The pins are in this case made of hard metal or ceramic or have, at least in the region of the supporting surface, a layer which contains carbides or borides.

In a further configuration, in particular when more than three blades are used, force elements which ensure that the surfaces of the pins are pressed uniformly against the supporting surface of the barrier sleeve are arranged at the foot end of the pins.

The barrier sleeve may in this case be designed in such a way that a small amount of wear is still accepted, especially since the barrier sleeve is a relatively simple geometrical part which can be easily exchanged. In a further configuration, the bearing surface in relation to the supporting elements is likewise made of hard-wearing material, so that consequently no wear occurs between the basic body and the barrier sleeve. In special cases, the entire barrier sleeve may be produced from a wear-reducing material.

DETAILED DESCRIPTION OF THE PRESENTLY PREFERRED EMBODIMENTS

Figure 1:
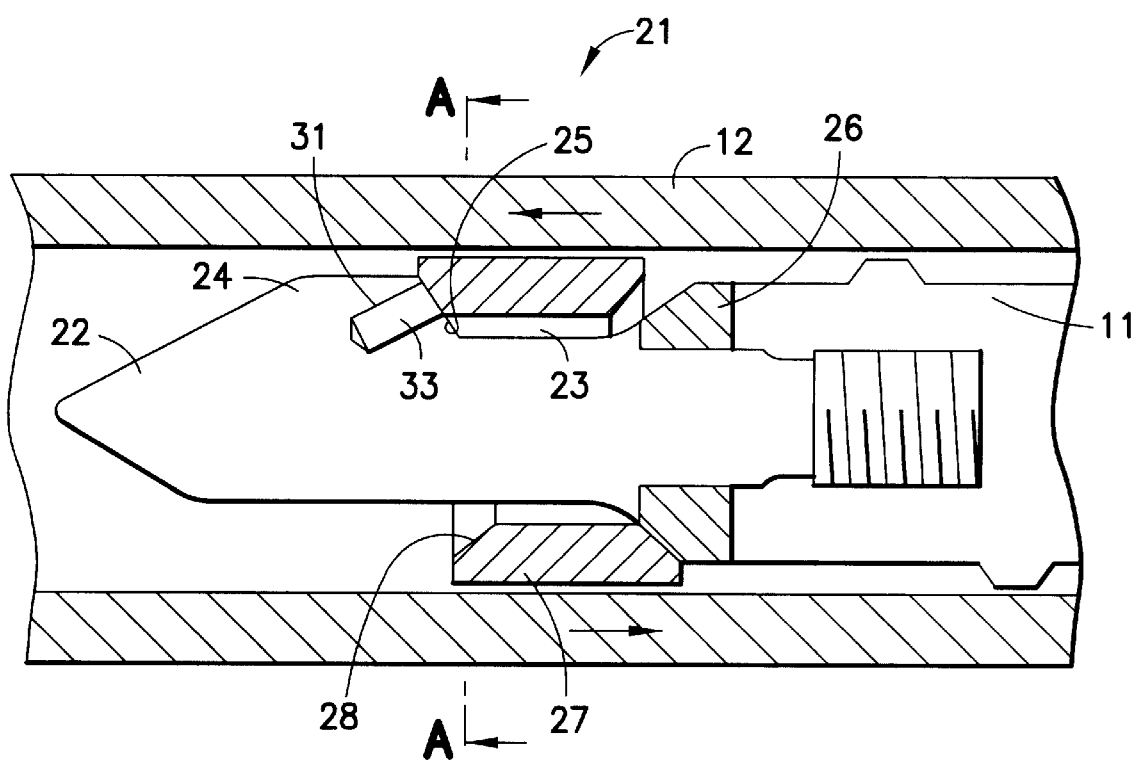
FIG. 1 shows a detail of the plasticizing cylinder with the head of the screw.

FIG. 1 shows part of a plasticizing cylinder 12, in which a screw 11 is arranged, at the head of which a non-return valve 21 is detachably fastened.

The non-return valve 21 has a basic body 22, which has a tapered region 23 which has a stop ring 26 facing the screw 11 and at least three blades 24 towards the tip.

The tapered region 23 is enveloped by a barrier sleeve 27, which is supported displaceably in the axial direction at one end on the surface 25 of the blades 24 facing the barrier sleeve 27 and, after displacement, at the other end on the stop ring 26 (both positions are shown in FIG. 1).

The supporting surface 28 of the barrier sleeve 27 facing the blades lies on supporting elements 31 provided in the blades 24. In the present example, the supporting element 31 is designed as a pin 33, which has a conically widening shape in the direction of the barrier sleeve 27.

Figure 2:
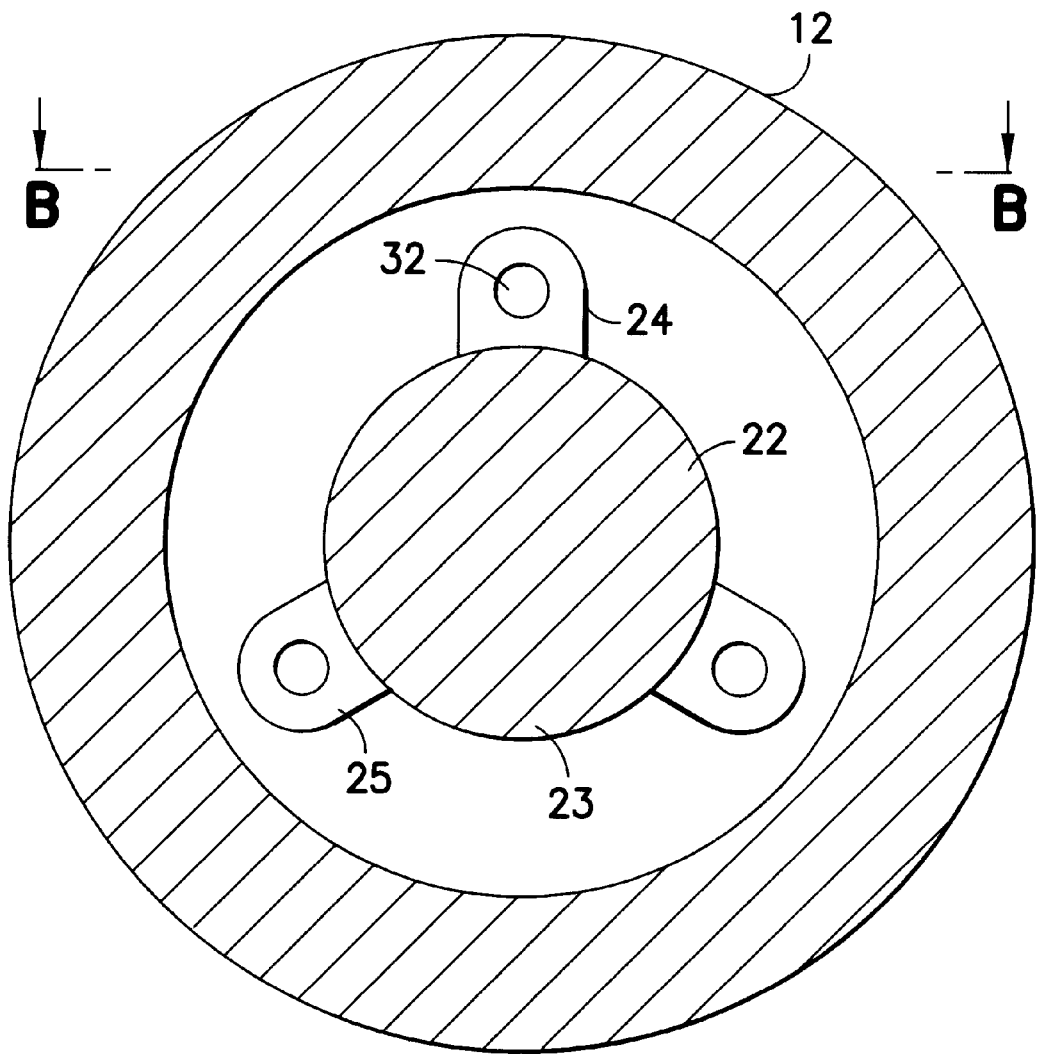
FIG. 2 shows a view in the direction AA according to FIG. 1.

Represented in FIG. 2 is the view AA, with a section through the plasticizing cylinder 12 with a view of the supporting elements 31 of the basic body 22 in the tapered region 23. Of the blades 24, the surface 25 facing the barrier sleeve can be seen, with the surface 32 of the supporting element 31 visible in the surface 25.

Figure 3:
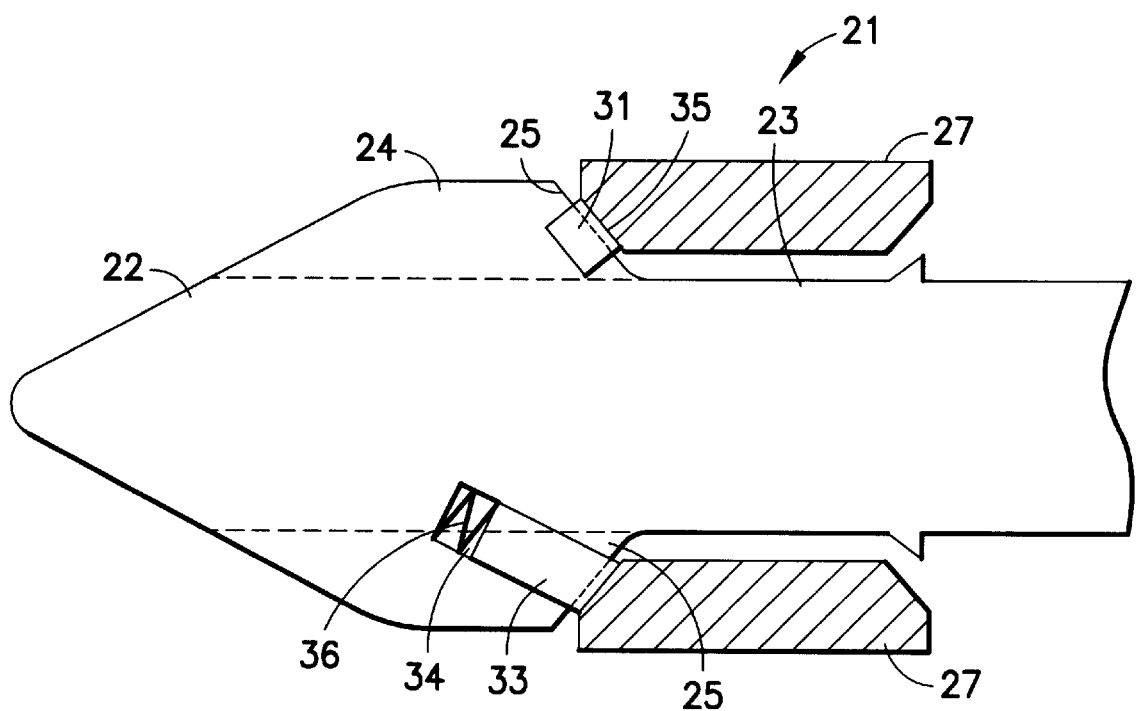
FIG. 3 shows a basic body with a barrier sleeve.

FIG. 3 shows part of the basic body 22, in which the barrier sleeve 27 is arranged in the tapered region 23. In the upper part of the figure, a supporting element 31 which has a cylindrical shape and whose surface facing the barrier sleeve has a wear-resistant layer 35 is represented in a blades 24.

In the lower part of the figure, a supporting element 31 is designed as a pin 33, at the foot end 34 of which a force element 36 is located.

Both supporting elements 31 represented in this figure protrude beyond the surface 25 of the blades 24.

Figure 4A:
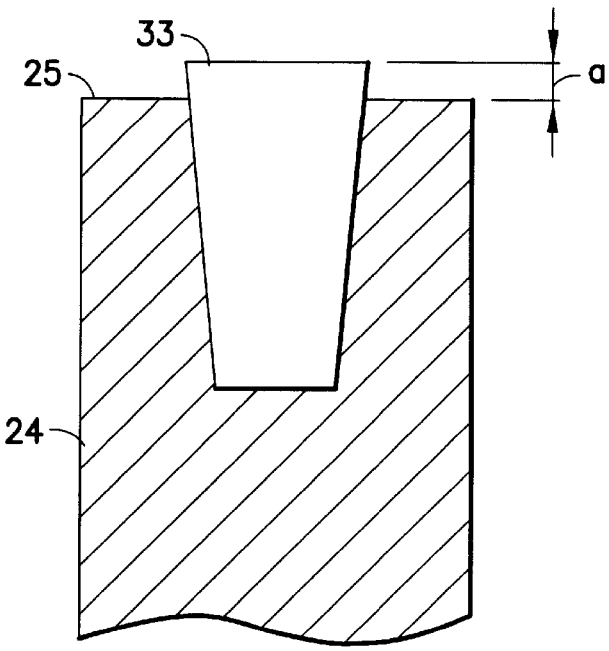
FIG. 4 shows a section of a blades according to view BB.
Figure 4B:
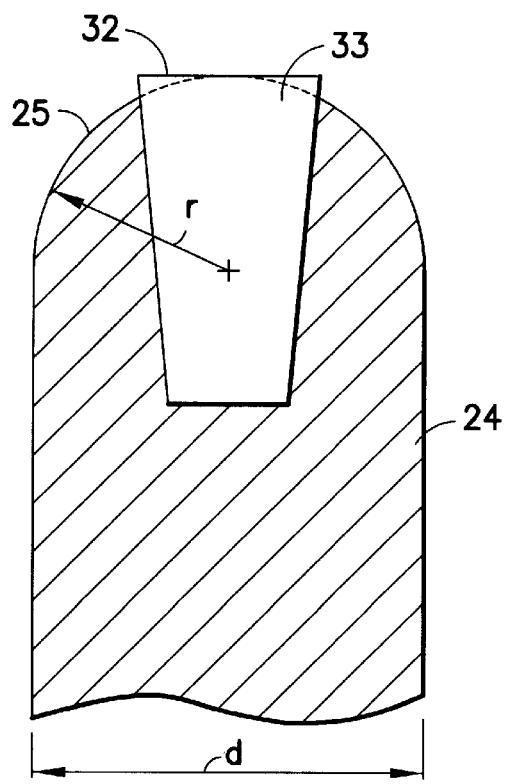

Represented in FIG. 4 is a detail of a blades 24 in the view BB. In FIGS. 4a and 4b, the supporting element 31 is designed in each case as a conical pin 33, which is pressed at the head end into the blades 24. The conical hard-metal bolt used here is consequently fixed in a prestressed manner in the receiving bore and is supported in such a way that crumbling of the outer zones of the bolt is prevented to the greatest extent by it being embedded in the receiving bore.

The head end of the pin 33 used here protrudes beyond the surface 25 of the blades 24 by the amount a.

In the right-hand part of FIG. 4b, the surface 25 of the blades 24 is rounded-off, to be precise with a radius r. The vertex of the surface 25 forms a tangent to the surface 32 of the pin 33.

What is claimed is:

1. A plasticizing unit for an injection molding machine, said plasticizing unit comprising
    a plasticizing cylinder,
    a rotatable and axially displaceable screw arranged in said plasticizing cylinder, said screw having a screw head, and
    a non-return valve comprising a basic body fixed to said screw head, said basic body comprising at least three blades having rear surfaces facing said screw head, and a tapered region between said blades and said screw head, said non-return valve further comprising support elements provided on said rear surfaces of said blades, said support elements having support surfaces which are made of a wear-resistant material, a stop ring fixed between said tapered region and said screw head, and a barrier sleeve which encloses said tapered region with radial play, said barrier sleeve being axially displaceable between said supporting surfaces and said stop ring, said barrier sleeve having a support surface which comes into contact with said support surfaces of said support elements, said support elements consisting of pins having axes which are oriented at right angles to the supporting surface of the barrier sleeve.

2. A plasticizing unit as in claim 1 wherein said barrier sleeve has a support surface which comes into contact with said support surfaces of said support elements, said support elements consisting of pins having axes which are oriented at right angles to the supporting surface.

3. A plasticizing unit as in claim 2 wherein said pins widen conically in the direction of the barrier sleeve.

4. A plasticizing unit as in claim 2 wherein said support surfaces of said support elements stand above the rear surfaces of the blades.

5. A plasticizing unit as in claim 1 wherein said rear surfaces of said blades each have an arcuate profile with a vertex, said support surfaces being arranged at said vertices.

6. A plasticizing unit as in claim 5 wherein said arcuate profile is a round circular profile with a radius $r=b/2$, where b is the thickness of the blade.

7. A plasticizing unit as in claim 1 wherein said barrier sleeve has a support surface which comes into contact with said support surfaces of said support elements, said support surface being made of a wear resistant material.

8. A plasticizing unit as in claim 1 wherein said support elements are made of one of hard metal and ceramic.

9. A plasticizing unit as in claim 1 wherein said wear-resistant material comprises one of carbides and borides.

10. A plasticizing unit as in claim 1 wherein each of said pins has a foot end opposite from said support surface of said pin, said non-return valve further comprising a force element bearing on each foot end so that the support surfaces of the pins are urged against the support surface of the barrier sleeve.

11. A non-return valve assembly for an injection molding machine having a plasticizing cylinder in which a rotatable and axially displaceable screw is arranged, said screw having a screw head at which said non-return valve is provided, said non-return valve comprising
    a basic body fixed to said screw head, said basic body comprising at least three blades having rear surfaces facing said screw head, and a tapered region between said blades and said screw head,
    support elements provided on said rear surfaces of said blades, said support elements having support surfaces which are made of a wear-resistant material,
    a stop ring fixed between said tapered region and said screw head, and
    a barrier sleeve which encloses said tapered region with radial play, said barrier sleeve being axially displaceable between said supporting surfaces and said stop ring, said barrier sleeve having a support surface which comes into contact with said support surfaces of said support elements, said support elements consisting of pins having axes which are oriented at right angles to the supporting surface of the barrier sleeve.

12. A non-return valve assembly as in claim 11 wherein said pins widen conically in the direction of the barrier sleeve.

13. A non-return valve assembly as in claim 11 wherein said support surfaces of said support elements stand above the rear surfaces of the blades.

14. A non-return valve assembly as in claim 11 wherein said rear surfaces of said blades each have an arcuate profile with a vertex, said support surfaces being arranged at said vertices.

15. A non-return valve as in claim 14 wherein said arcuate profile is a rounded circular profile with a radius r=b/2, where b is the thickness of the blade.

16. A non-return valve as in claim 11 wherein said barrier sleeve has a support surface which comes into contact with said support surfaces of said support elements, said support surface being made of a wear resistant material.

17. A non-return valve as in claim 11 wherein said support elements are made of one of hard metal and ceramic.

18. A non-return valve as in claim 11 wherein said wear-resistant material comprises one of carbides and borides.

19. A non-return valve as in claim 11 wherein each of said pins has a foot end opposite from said support surface of said pin, said non-return valve further comprising a force element bearing on each foot end so that the support surfaces of the pins are urged against the support surface of the barrier sleeve.

* * * * *